(12) United States Patent
Lee et al.

(10) Patent No.: US 7,185,510 B2
(45) Date of Patent: Mar. 6, 2007

(54) AIR CONDITIONING AND VENTILATING SYSTEM

(75) Inventors: Gi Seop Lee, Incheon (KR); Kyung Hwan Kim, Seoul (KR); Jeong Yong Kim, Sindorim-dong (KR)

(73) Assignee: LG Electronics Inc., Seoul (KR)

( * ) Notice: Subject to any disclaimer, the term of this patent is extended or adjusted under 35 U.S.C. 154(b) by 100 days.

(21) Appl. No.: 10/808,450

(22) Filed: Mar. 25, 2004

(65) Prior Publication Data

US 2004/0237572 A1 Dec. 2, 2004

(30) Foreign Application Priority Data

May 28, 2003 (KR) ...................... 10-2003-0034079

(51) Int. Cl.
*F25D 17/06* (2006.01)

(52) U.S. Cl. .......................................... 62/419; 62/411

(58) Field of Classification Search .................... 62/92, 62/159, 411, 419, 427
See application file for complete search history.

(56) References Cited

U.S. PATENT DOCUMENTS 3,988,900 A * 11/1976 Kamata et al. ................ 62/92

| 5,577,958 | A  | * | 11/1996 | Kumekawa et al. | ........ 454/233 |
|-----------|-----|---|---------|-----------------|-----------------|
| 6,213,867 | B1 | * | 4/2001  | Yazici et al.   | ................. 454/263 |
| 6,378,317 | B1 |   | 4/2002  | Ribo et al.     |                 |
| 6,648,752 | B2 | * | 11/2003 | Vernier et al.  | .............. 454/304 |

FOREIGN PATENT DOCUMENTS

| CN | 2442166 Y      | 8/2001 |
| CN | 1356509 A      | 7/2002 |
| EP | 0 774 628 A2   | 5/1997 |
| JP | 60-78242 A     | 5/1985 |
| JP | 2001-227772 A  | 8/2001 |
| KR | 2003-0049323 A | 6/2003 |

* cited by examiner

*Primary Examiner*—Melvin Jones
(74) *Attorney, Agent, or Firm*—Birch, Stewart, Kolasch & Birch, LLP

(57) ABSTRACT

Air conditioning and ventilating system including air conditioner installed on a ceiling, having air outlets for discharging air having heat heat exchanged at an indoor heat exchanger, and a device for controlling a direction of air discharged from the air outlets, a first air passage for guiding outdoor air to a room, and a second air passage for guiding room air to an outdoor. The first, and second air passages cross at a part, where a regenerative heat exchanger is provided. The deflecting plate is tilted at an angle from a ceiling surface for directing the air from the air outlet, not vertical to the ceiling surface, but at an angle from the ceiling surface.

13 Claims, 6 Drawing Sheets

AIR CONDITIONING AND VENTILATING SYSTEM

This application claims the benefit of the Korean Application No. P2003-0034079 filed on May 28, 2003, which is hereby incorporated by reference.

BACKGROUND OF THE INVENTION

1. Field of the Invention

The present invention relates to air conditioning systems, and more particularly, to an air conditioning and ventilating system which enables ventilation during operation of an air conditioner.

2. Background of the Related Art

In general, the air conditioner conditions a temperature, a humidity, air motion, and cleanliness of air in a particular area to suit to a purpose of use. For an example, the air conditioner is provided with a compressor and a heat exchanger to circulate refrigerant for cooling or heating a room space, such as a residential space, a restaurant, a library, or an office.

The related art air conditioner is provided with a compressor for compressing refrigerant to high temperature and pressure, an outdoor heat exchanger for making the refrigerant in the air conditioner to heat exchange with room air, and an expansion device between an indoor heat exchanger and the outdoor heat exchanger.

The outdoor heat exchanger serves as a condenser or an evaporator depending on an operation condition, and the indoor heat exchanger serves as an evaporator or a condenser, opposite to the outdoor heat exchanger. When the indoor heat exchanger serves as the evaporator, the room is cooled, and when the indoor heat exchanger serves as the condenser, the room is heated.

For enhancing an air conditioning efficiency, the room is closed during operation of the air conditioner. If the air conditioner is operated in a state the room is closed, a carbon dioxide content of the room increases as time passes by, to contaminate the room air. Therefore, it is required to ventilate the room at regular intervals for making the more comfortable, when a ventilating device is in general used.

In the related art, for the ventilation, the room air has been forcibly discharged to an outside of the room with a fan. However, the forced discharge of room air to an outside of the room with one fan causes problems in that it is liable to cause shortage of oxygen in the room as fresh air is not introduced into the room properly, and there is a waste of energy as cooled down, or heated room air is discharged to the outside of the room as it is, and an outdoor air having great temperature or humidity difference from the room air is introduced into the room though gaps of doors and windows.

To cope with the problems, it is required to develop a cooling and heating system that cools/heats the room, as well as ventilates the room with least heat loss.

SUMMARY OF THE INVENTION

Accordingly, the present invention is directed to an air conditioning and ventilating system that substantially obviates one or more of the problems due to limitations and disadvantages of the related art.

An object of the present invention is to provide an air conditioning system, in which can carry of ventilation exclusively, or together with cooling or heating.

Other object of the present invention is to provide an air conditioning and ventilating system which can minimize heat loss even during ventilation.

Another object of the present invention is to provide an air conditioning and ventilating system which can make a uniform distribution of air introduced into a room from an outdoor to supply enough fresh air to persons in the room.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the air conditioning and ventilating system includes an air conditioner installed on a ceiling, having air outlets for discharging air having heat heat exchanged at an indoor heat exchanger, and a device for controlling a direction of air discharged from the air outlets, a first air passage for guiding outdoor air to a room, and a second air passage for guiding room air to an outdoor.

The first air passage, and the second air passage are closable.

The device includes a deflecting plate.

The deflecting plate is tilted at an angle from a ceiling surface for directing the air from the air outlet, not vertical to the ceiling surface, but at an angle from the ceiling surface.

The deflecting plate is arranged along a side of the air outlet, tilted toward the ceiling surface having the air outlet formed therein.

The deflecting plate is tilted at an angle in a range of 15°~45° from the ceiling surface having the air outlet formed therein, in a case a temperature of the air discharged to the room through the first air passage is higher than a temperature of the room air.

The deflecting plate is tilted at an angle in a range of 45°~90° from the ceiling surface having the air outlet formed therein, in a case a temperature of the air discharged to the room through the first air passage is lower than a temperature of the room air.

The device further includes a controlling part for controlling an angle of the deflecting plate.

The deflecting plate swings automatically within a preset range of angle from the ceiling surface having the air outlet formed therein, for automatic change of a direction of the air discharged to the room through the air outlet.

The first air passage includes at least one air inlet port for supplying air to the room in a direction the ceiling surface forms an acute angle from the deflecting plate.

The first, and second air passages cross at a part.

The air conditioning and ventilating further includes a regenerative heat exchanger at the cross part of the first air passage, and the second air passage for making the room air and the outdoor air passed through the cross part to heat exchange with each other.

Thus, the air conditioning and ventilating system enables ventilation even during cooling/heating operation, minimizes a heat loss during the ventilation, and supplies outdoor fresh air to entire room, uniformly.

It is to be understood that both the foregoing description and the following detailed description of the present invention are exemplary and explanatory and are intended to provide further explanation of the invention claimed.

BRIEF DESCRITPION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings. In describing embodiments, same parts will be given the same names and reference symbols, and repetitive description of which will be omitted.

For better understanding of the present invention, functions of the air conditioner will be described.

In general, the air conditioner conditions a temperature, a humidity, air motion, and cleanliness of air in a particular area to suit to a purpose of use. For an example, the air conditioner cools or heats a room space, such as a residential space, a restaurant, a library, or an office.

The air conditioner has an indoor unit and an outdoor unit. The indoor unit is installed in a room, and has an indoor heat exchanger. The outdoor unit is installed in an outdoor, and has an outdoor heat exchanger for heat exchanging with an outdoor air.

The air conditioner also has a compressor for compressing refrigerant to high temperature and pressure, and an expansion device between an indoor heat exchanger and the outdoor heat exchanger, for expanding the high pressure, high temperature refrigerant to a low temperature, low pressure refrigerant.

The air conditioning and ventilating system in accordance with a preferred embodiment of the present invention will be described, with reference to FIGS. 1~4.

Figure 1:
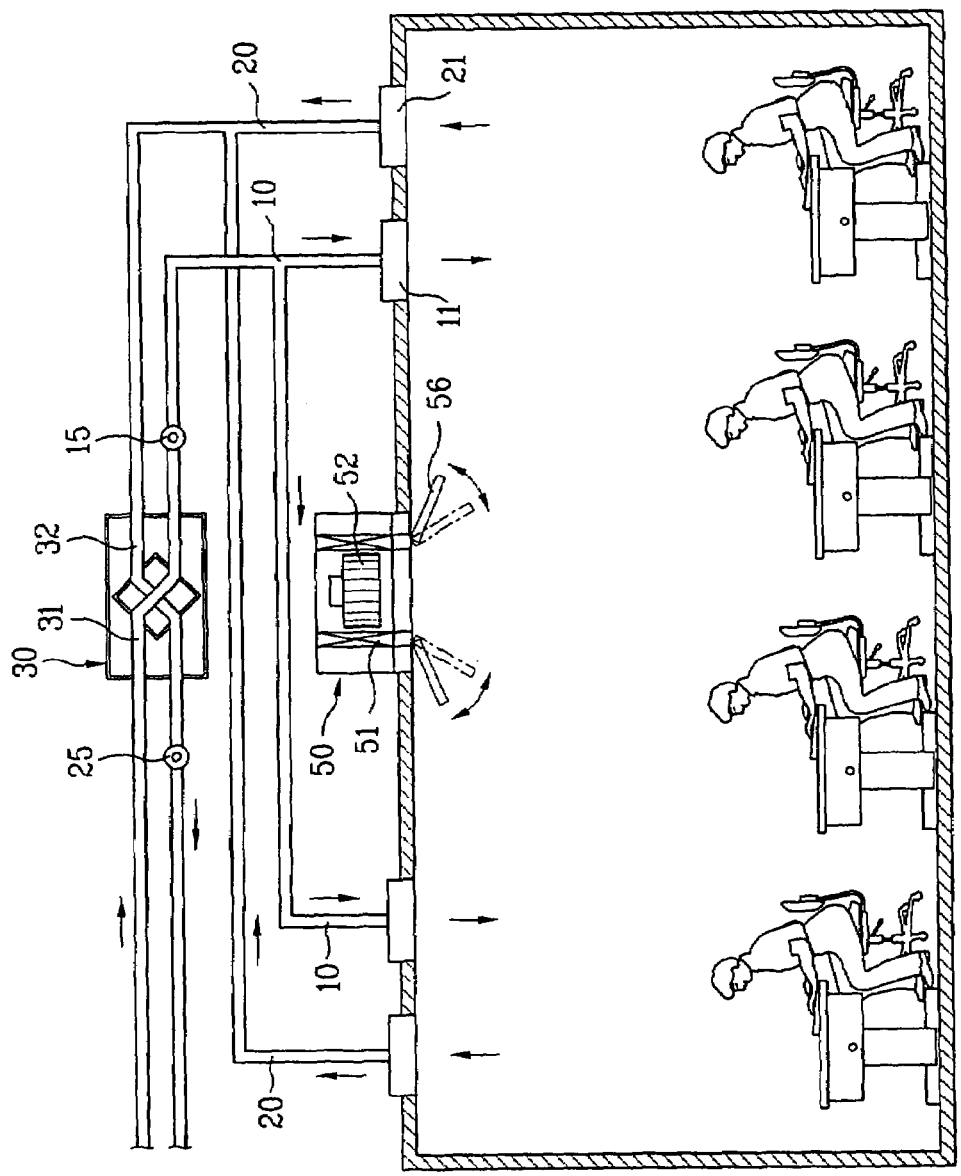
FIG. 1 illustrates a diagram of an air conditioning and ventilating system in accordance with a preferred embodiment of the present invention.

Referring to FIG. 1, the air conditioning and ventilating system includes an air conditioner for cooling/heating a room, a first air passage 10 for guiding air from an outdoor to an indoor, and a second air passage 20 for guiding air from the indoor to the outdoor.

The air conditioner includes an indoor unit 50, and an outdoor unit (not shown) having an outdoor heat exchanger.

The indoor unit 50 includes an indoor heat exchanger for serving as an evaporator or a condenser depending on an operation condition, and a fan for drawing room air, and blowing the room air having heat exchanged at the indoor heat exchanger to the room again.

Though the indoor unit 50 may have a variety of systems, in the present invention, the fan is a centrifugal fan 52 in a central part of the indoor unit, and the indoor heat exchanger 51 is arranged in a direction the air is discharged from the centrifugal fan.

Figure 2:
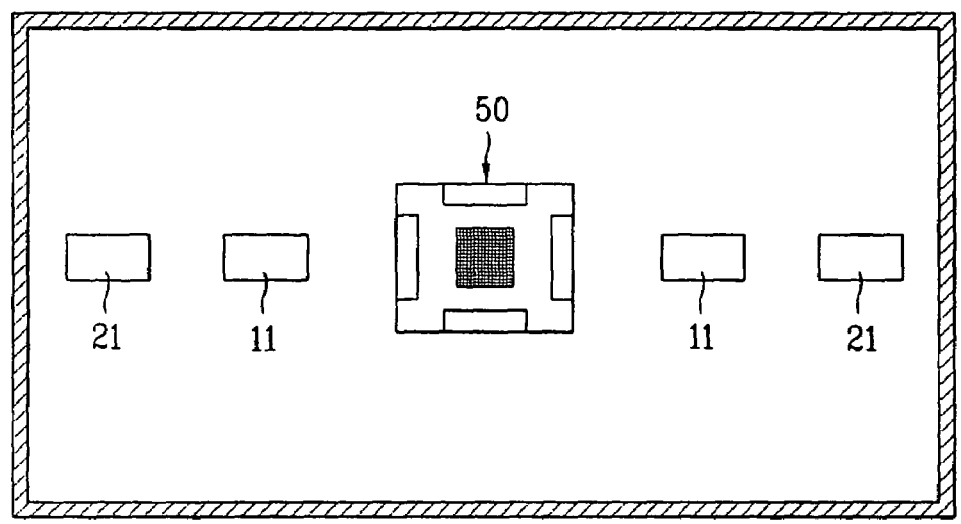
FIG. 2 illustrates a diagram of a ceiling of a room having an air conditioning and ventilating system in accordance with a preferred embodiment of the present invention installed thereon.

In the meantime, as shown in FIG. 1 or 2, even though it is preferable that indoor unit is installed in a central part of ceiling, the position may vary with a room structure, and a number of the indoor units may also vary with a room space.

Different from above system, the fan in the indoor unit may be an axial fan, when the indoor heat exchanger is installed on a discharge side of the axial fan.

The first air passage 10 and the second air passage 20 are closable, and parts of which intersect at a position where the regenerative heat exchanger 30 is preferably provided.

The outdoor air supplied to the room through the first air passage and the room air discharged to the outdoor through the second air passage 20 make heat exchange at the regenerative heat exchanger 30.

The regenerative heat exchanger 30 is provided thus for recovering a portion of energy to reduce an energy loss.

Figure 3A:
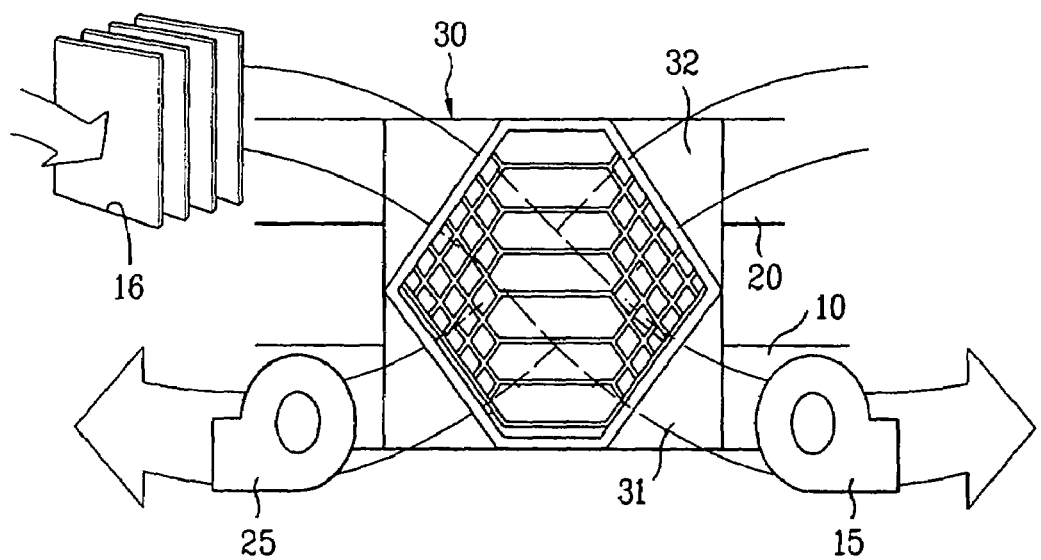
FIGS. 3A and 3B illustrate diagrams each showing one embodiment of a regenerative heat exchanger provided in the present invention.

Referring to FIG. 3A, the regenerative heat exchanger 30 includes a first flow part 31 having a plurality of flow passages for passing air introduced from the outdoor and flowing through the first air passage 10, and a second flow part 32 having a plurality of flow passages in contact with the first flow part for passing air from the room and flowing through the second air passage 20.

It is preferable that interfaces of the first flow part 31 and the second flow part 32 are made of heat exchange films of a material having an excellent heat conductivity. An embodiment of the regenerative heat exchanger will be described with reference to FIG. 3B.

Figure 3B:
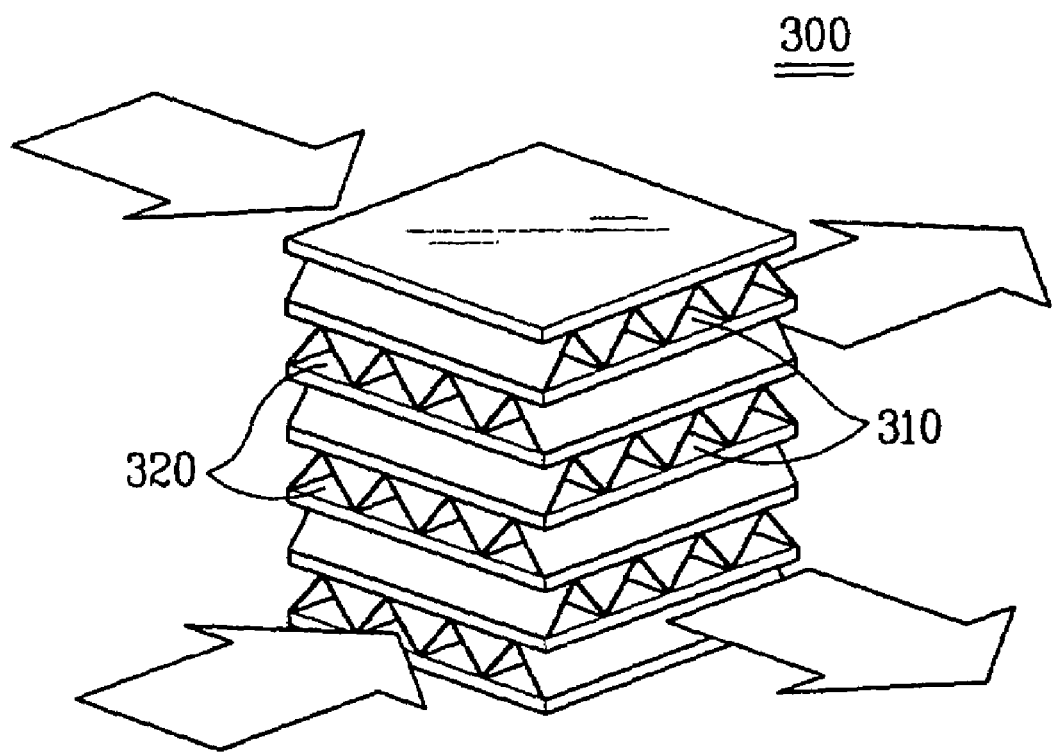

Referring to FIG. 3B, for enhancing a heat exchange efficiency of the regenerative heat exchanger 300, the regenerative heat exchanger may include a plurality of layers having an alternative stack of the first flow part 310 and the second flow part 320, for increasing a heat exchange area to enhance a heat exchange efficiency. It is preferable that walls of the first flow part 310 and the second flow part 320 are formed of a material having an excellent heat conductivity, such as aluminum.

Though not shown, the second flow part may include a plurality of pipes passing through the first flow part. That is, any structure that can maximize a heat exchange area of the first flow part and the second flow part can be employed.

Referring to FIG. 1, it is preferable that the first air passage 10 includes a first fan 15 for drawing outdoor air forcibly and discharging to the room. Though the first fan can be arranged on any point of the first air passage 10, in the embodiment of the present invention, the first fan is arranged on an air discharge side of the first flow part 31.

The first air passage 10 may further include an air cleaning filter 16 for removing foreign matters from the air introduced from the outdoor. Though the air cleaning filter 16 can be installed on any point of the first air passage 10, the air cleaning filter 16 is arranged on an air inlet side of the first flow part in the embodiment.

It is preferable that the second air passage 20 includes a second fan 25 for drawing room air forcibly, and discharging toward the outdoor. Though the second fan 25 can be arranged on any point of the second air passage 20, in the embodiment, the second fan 25 is arranged on an air outlet side of the second flow part 32.

At positions spaced away from a part of the ceiling the indoor unit is installed thereon, there are at least one air inlet port 11 for supplying outdoor air to the room, and at least one air outlet port 21 for discharging room air.

Each of the air inlet ports 11 is connected to a room side end of the first air passage 10, to form a part of the first air passage 10, and each of the air outlet ports 21 is connected a room side end of the second air passage 20, to form a part of the second air passage 20.

FIG. 2 illustrates a diagram of a ceiling of a room having an air conditioning and ventilating system shown in FIG. 1 installed thereon.

Figure 4:
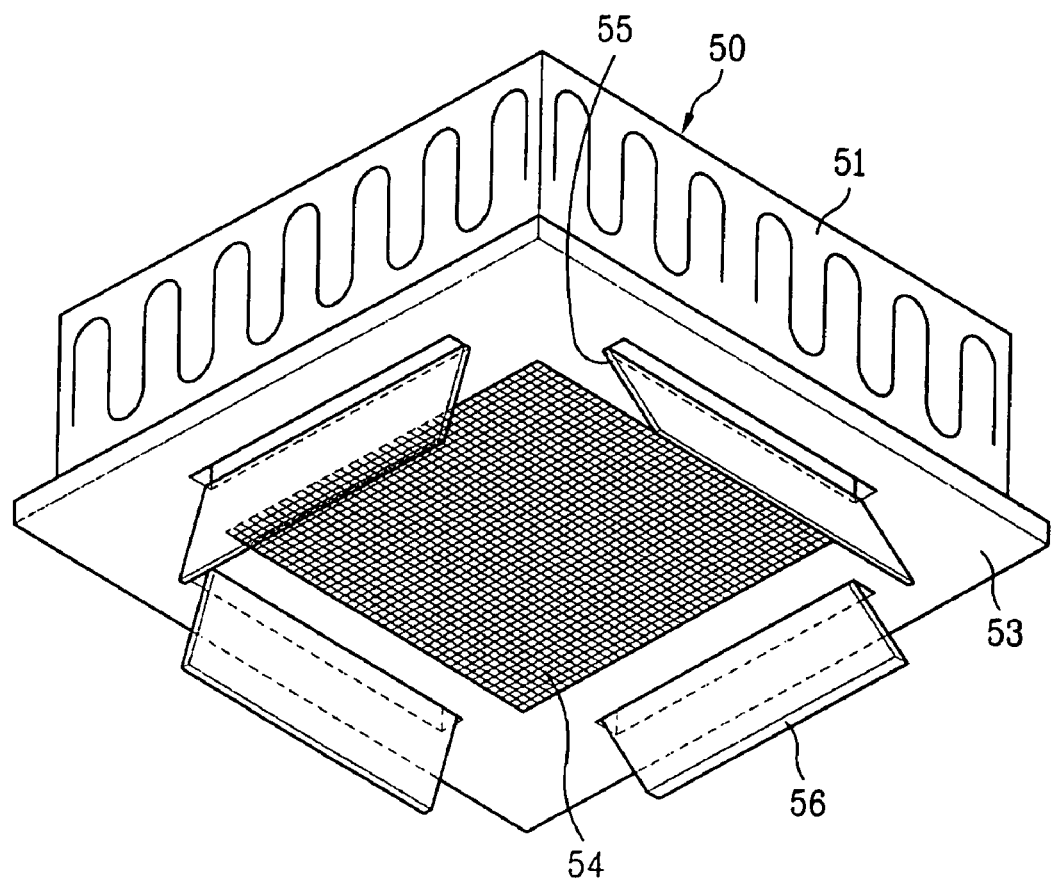
FIG. 4 illustrates a diagram of an indoor unit in an air conditioning and ventilating system in accordance with a preferred embodiment of the present invention.

In the meantime, referring to FIG. 4, the indoor unit further includes a square panel 53 under the centrifugal fan and the indoor heat exchanger. The panel 53 includes an air inlet 54 for passing room air from the room toward the centrifugal fan 52, and air outlets 55 around the air inlet 54 for supplying the room air having heat exchanged at the indoor heat exchanger to the room.

It is preferable that the indoor unit further includes deflecting devices for deflecting a direction of air supplied to the room through the air outlets. Because the outdoor air, supplied to the room through the first air passage 10, has a temperature and a humidity, and the like different from the room air, that may impede smooth circulation of the air. This is because there are slight differences between the outdoor air and the room air even if the regenerative heat exchanger 30 is provided.

In more detail, when the outdoor air is supplied to the room for ventilation of the room during operation of the air conditioner in summer, the outdoor air supplied to the room has a temperature higher than air temperature of the room. Due to this, there is a density difference between the room air and the outdoor air, such that the outdoor air with a low density does not fall down, but stays near to the ceiling, failing in uniform supply of fresh air to the entire room.

As one form of the deflecting device for making smooth room air circulation for making the fresh air and the air discharged from the indoor unit to reach every place of the room, the deflecting device includes a deflecting plate 56 attached to the air outlet side.

For supplying the fresh outdoor air to entire room uniformly, it is preferable that the deflecting plate 56 is attached such that the air discharged to the room through the air outlet 55 is directed, not vertical to a ceiling surface, but at an angle from the ceiling surface.

In the embodiment, the deflecting plate 56 is attached to part along one side of the rectangular air outlet 55, tilted toward a direction of the ceiling surface the air outlet is formed therein.

It is preferable that the direction of the ceiling surface the air outlet is formed therein toward which the defecting plate 56 is tilted is the same with a direction in which the air inlet ports 11 of the first air passage 10 are formed therein.

In FIG. 4, even though the deflecting plate 56 is projected toward room, it is not required that the deflecting plate 56 is limited to above configuration, but a variety of configurations is applicable.

Figure 5:
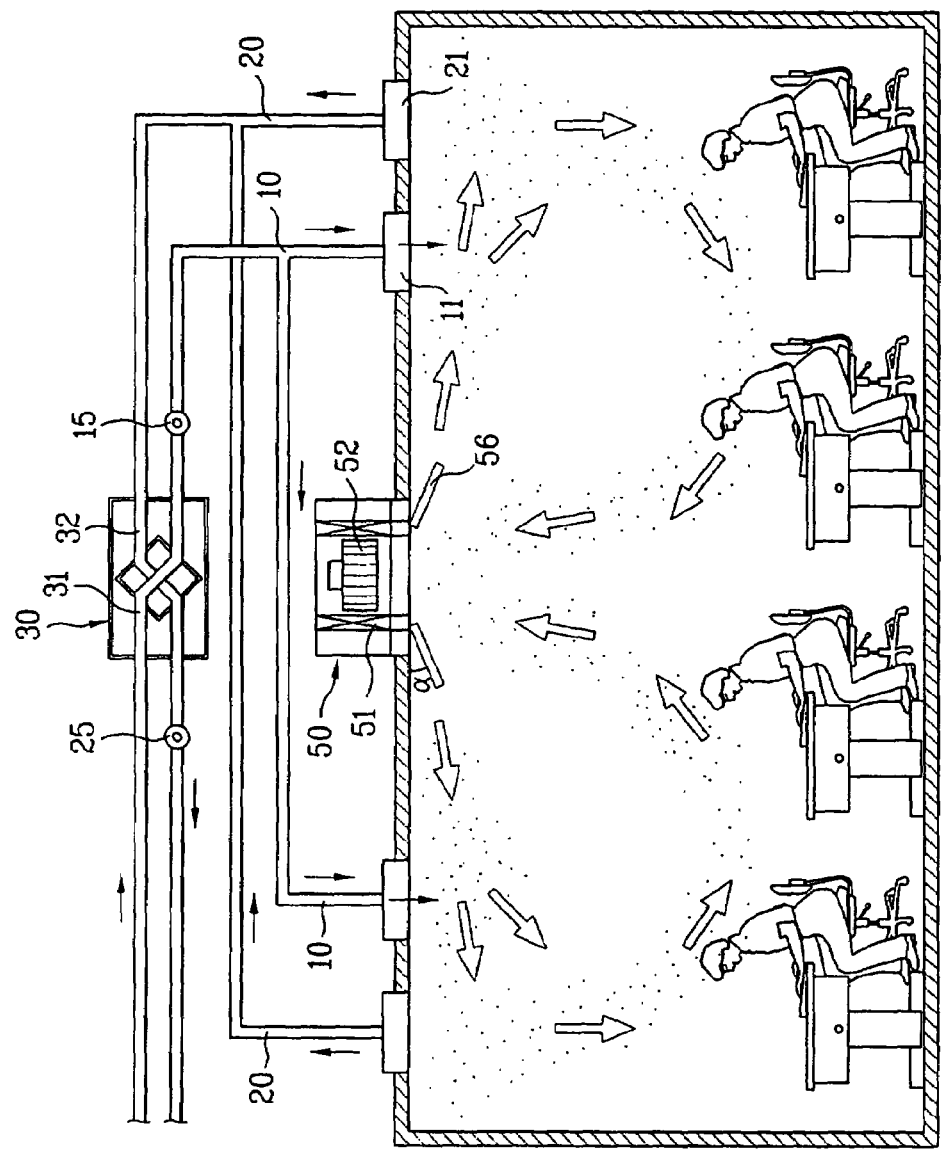
FIG. 5 illustrates a diagram showing an operation angle of a deflecting plate in a case an outdoor temperature is higher than a room air temperature.
Figure 6:
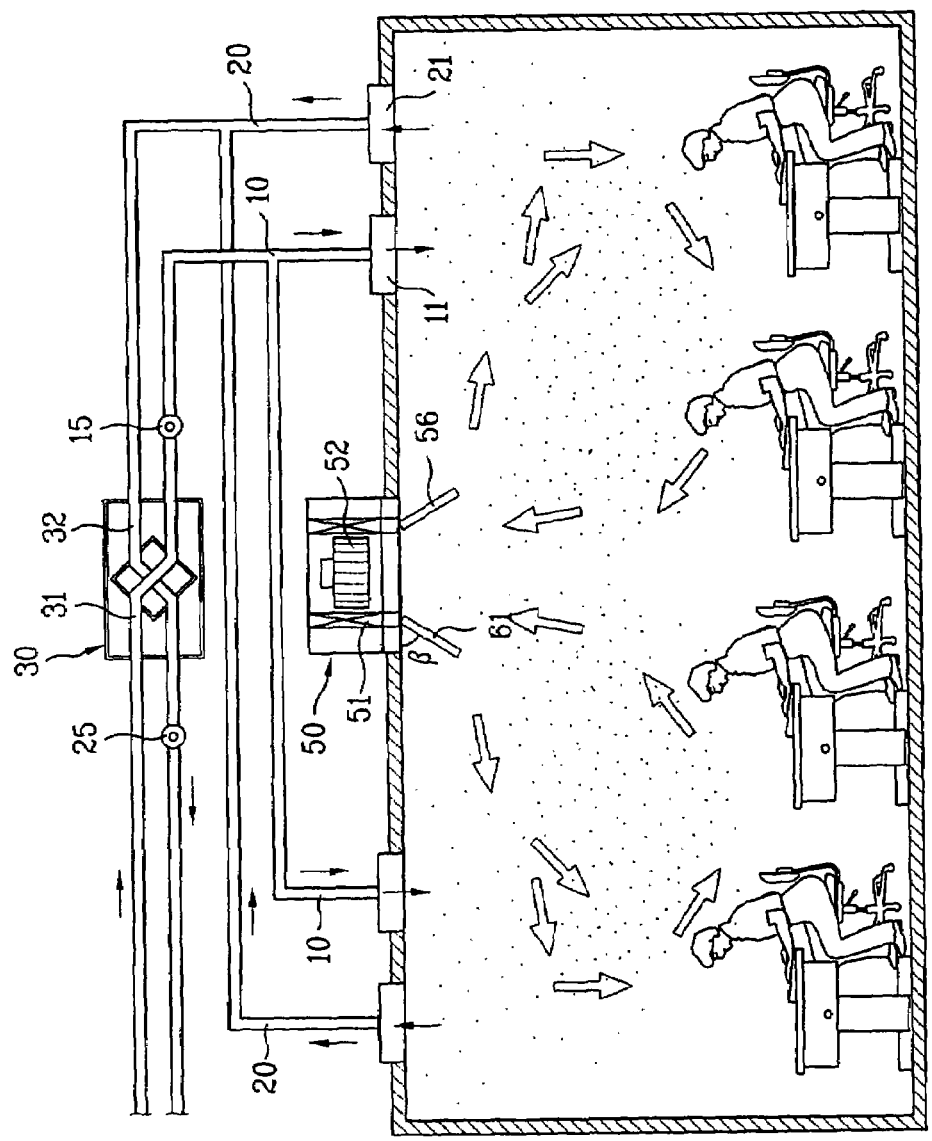
FIG. 6 illustrates a diagram showing an operation angle of a deflecting plate in a case an outdoor temperature is equal to or lower than a room air temperature.

FIGS. 5 and 6 illustrate operation states of an air conditioning and ventilating system for different indoor and outdoor environments.

Referring to FIG. 5, in a case a temperature of the air discharged to the room through the first air passage 10 is higher than the room temperature, it is preferable that the deflecting plate 56 is tilted at an angle in a range of 15°~45° from the ceiling surface having the air outlets formed therein, for circulation of the fresh air staying close to the ceiling to entire room by the air from the air outlets.

Referring to FIG. 6, in a case a temperature of the air discharged to the room through the first air passage 10 is the same or lower than the room temperature, it is preferable that the deflecting plate 56 is tilted at an angle in a range of 45°~90° from the ceiling surface having the air outlets formed therein.

The defecting device may further include a controlling part (not shown) for controlling an angle of the defecting plate according to an air conditioning environment. The deflecting plate 56 may be controlled by the controlling part such that a direction of air discharged from the air outlet into the room is varied automatically. In other words, the deflecting plate may swing automatically within a preset range.

Even though FIG. 4 illustrates a hexahedral indoor unit, the shape is not limited to this. Different from what is shown in the drawing, the air outlets may be circular surrounding the air inlet, when the deflecting plates may be projected toward room from an inner side of the air outlets. That is, the deflecting plates may be applied in various forms according to positions and forms of the air outlets, and air inlet.

The operation of the air conditioning and ventilating system will be described for different operation modes.

For ventilation during operation of the air conditioner, both the first air passage 10 and the second air passage 20 are opened, and the fans 15, and 25 on respective air passages are put into operation.

As the fans are operated, the outdoor air is introduced into the first flow part 31 of the regenerative heat exchanger 30 through the first air passage 10, and the room air is introduced into the second flow part 32 through the second air passage 20, to make heat exchange with each other. The outdoor air having a regenerative heat exchanger process passed through thus is supplied to room through the air inlet in the ceiling.

If the air conditioner is operated in a cooling mode, the temperature of the outdoor air is higher than the temperature of room air, such that the outdoor air fails to circulate through entire room, but stays close to the ceiling.

In this instance, the defecting plate is tilted at an angle in a range of 14°~45° from the ceiling surface by the controlling part, to enable the outdoor air staying close to the ceiling surface to circulate through the entire room.

Opposite to this, if the air conditioner is operated in a heating mode, the temperature of the outdoor air is lower than the temperature of room air, such that the outdoor supplied to the room moves a lower part of the room, naturally. Therefore, it is preferable that the deflecting plate is tilted at an angle in a range of 45°~90° from the ceiling surface by the controlling part.

As has been described, the air conditioning and ventilating system of the present invention has the following advantages.

First, since air conditioning and ventilation can be carried out at the same time, room can be maintained fresh even after long time operation of the system.

Second, the heat exchange between the outdoor air introduced into the room through the first air passage 10 and the room air discharged to the outdoor at the regenerative heat exchanger 30 permits to reduce a heat loss.

Third the fresh outdoor air supplied to the room can be distributed to entire room uniformly.

Fourth, the quick supply of fresh air to entire room can save power consumption because a ventilation time period is required no more than necessary.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An air conditioning and ventilating system comprising:
    an air conditioner installed at a ceiling of a room, the air conditioner including
        an indoor heat exchanger,
        at least one air outlet for discharging air heat exchanged at the indoor heat exchanger, and
        a device for controlling a direction of the air discharged from the at least one air outlet into the room;
    a first air passage spaced from the air conditioner for guiding air outside the room to the room; and
    a second air passage spaced from the air conditioner for guiding air in the room to be outside the room.

2. The air conditioning and ventilating system as claimed in claim 1, wherein the first air passage, and the second air passage are closable.

3. The air conditioning and ventilating system as claimed in claim 1, wherein the device includes a deflecting plate.

4. The air conditioning and ventilating system as claimed in claim 3, wherein the deflecting plate is tilted at an angle from a ceiling surface for directing the air from the air outlet, not vertical to the ceiling surface, but at an angle from the ceiling surface.

5. The air conditioning and ventilating system as claimed in claim 4, wherein the deflecting plate is arranged along a side of the air outlet, tilted toward the ceiling surface having the air outlet formed therein.

6. The air conditioning and ventilating system as claimed in claim 5, wherein the deflecting plate is tilted at an angle in a range of 15°~45° from the ceiling surface having the air outlet formed therein, in a case a temperature of the air discharged to the room through the first air passage is higher than a temperature of the room air.

7. The air conditioning and ventilating system as claimed in claim 5, wherein the deflecting plate is tilted at an angle in a range of 45°~90° from the ceiling surface having the air outlet formed therein, in a case a temperature of the air discharged to the room through the first air passage is lower than a temperature of the room air.

8. The air conditioning and ventilating system as claimed in claim 3, wherein the device further includes a controlling part for controlling an angle of the deflecting plate.

9. The air conditioning and ventilating system as claimed in claim 8, wherein the deflecting plate swings automatically within a preset range of angle from the ceiling surface having the air outlet formed therein, for automatic change of a direction of the air discharged to the room through the air outlet.

10. The air conditioning and ventilating system as claimed in claim 4, wherein the first air passage includes at least one air inlet port for supplying air to the room in a direction the ceiling surface forms an acute angle from the deflecting plate.

11. The air conditioning and ventilating system as claimed in claim 1, wherein the first, and second air passages cross at a part.

12. The air conditioning and ventilating system as claimed in claim 11, further comprising a regenerative heat exchanger at the cross part of the first air passage, and the second air passage for making the room air and the outdoor air passed through the cross part to heat exchange with each other.

13. An air conditioning and ventilating system comprising:
    an air conditioner installed on a ceiling, having air outlets for discharging air having heat heat exchanged at an indoor heat exchanger, and a device for controlling a direction of air discharged from the air outlets, wherein the device includes a deflecting plate and the deflecting plate is tilted at an angle from a ceiling surface for directing the air from the air outlet, not vertical to the ceiling surface, but at an angle from the ceiling surface;
    a first air passage for guiding outdoor air to a room; and
    a second air passage for guiding room air to an outdoor.

* * * * *